US011967107B2

(12) United States Patent
Takemoto

(10) Patent No.: US 11,967,107 B2
(45) Date of Patent: Apr. 23, 2024

(54) INFORMATION PROCESSING APPARATUS AND METHOD OF ESTIMATING POSITION AND ORIENTATION OF IMAGE CAPTURING APPARATUS

(71) Applicant: CANON KABUSHIKI KAISHA, Tokyo (JP)

(72) Inventor: Kazuki Takemoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 497 days.

(21) Appl. No.: 17/207,230

(22) Filed: Mar. 19, 2021

(65) Prior Publication Data

US 2021/0304436 A1    Sep. 30, 2021

(30) Foreign Application Priority Data

Mar. 24, 2020    (JP) .................................. 2020-053008

(51) Int. Cl.
*H04N 23/63*    (2023.01)
*G06T 7/73*    (2017.01)

(52) U.S. Cl.
CPC ............... *G06T 7/74* (2017.01); *H04N 23/63* (2023.01); *G06T 2207/30244* (2013.01)

(58) Field of Classification Search
CPC .................. G06T 7/74; H04N 23/63

USPC .......................................................... 348/135
See application file for complete search history.

(56) References Cited

U.S. PATENT DOCUMENTS

| 2016/0093058 | A1* | 3/2016 | Moteki | ..................... G06T 7/73 382/154 |
| 2020/0263994 | A1* | 8/2020 | Lee | ........................... G06T 7/74 |

FOREIGN PATENT DOCUMENTS

| JP | 2015211363 A | 11/2015 |
| JP | 2018014579 A | 1/2018 |

* cited by examiner

*Primary Examiner* — Amir Shahnami
(74) *Attorney, Agent, or Firm* — CANON U.S.A., INC. IP Division

(57) ABSTRACT

An apparatus includes a generation unit configured to generate map information including a position of a feature point and identification information on an index in an image of a real space captured by a capturing apparatus, a collation unit configured to collate the identification information on the index in the generated map information with the identification information on the index in one or more pieces of registered map information, and to extract map information from the one or more pieces of registered map information based on a result of the collation, and an estimation unit configured to estimate a position and orientation of the capturing apparatus based on the position of the feature point in the extracted map information and the position of the feature point in the generated map information.

17 Claims, 11 Drawing Sheets

FIG.5A

| FEATURE POINT ID | THREE-DIMENSIONAL POSITION | IMAGE DATA |
|---|---|---|
| 1000 | (256,1200,6532) | IMAGE 1 |
| 1001 | (374,2104,7588) | IMAGE 2 |

FIG.5B

| KEY FRAME ID | IMAGE DATA | KEY FRAME POSITION | KEY FRAME ORIENTATION ROTATION AXIS | KEY FRAME ORIENTATION ROTATION ANGLE [DEGREES] | FEATURE POINT ID | MARKER ID |
|---|---|---|---|---|---|---|
| 1 | IMAGE 1 | (2169,315,2541) | (1985,3121,4141) | 26.3 | 1000,2056,3066,8014 | 2,5,6,10 |
| ... | | | | | | |

FIG.5C

| MARKER ID | POSITION [mm] | ORIENTATION ROTATION AXIS | ORIENTATION ROTATION ANGLE [DEGREES] |
|---|---|---|---|
| 2 | (298,150,1501) | (0.0,0.2,0.75) | 0.6 |
| 5 | (1985,3121,4141) | (0.0,0.1,0.77) | 0.2 |
| ... | | | |

FIG.6A

| 11-20-2018-10_18_44 | ▲ |
| 11-20-2018-10_19_22 | |
| 11-20-2018-10_19_30 | |
| 11-21-2018-18_37_34 | |
| 11-21-2018-18_39_22 | ▼ |

FIG.6B

| 11-20-2018-10_18_44 | ▲ |
| 11-20-2018-10_19_22 | |
| 11-20-2018-10_19_30 | |
| | |
| | ▼ |

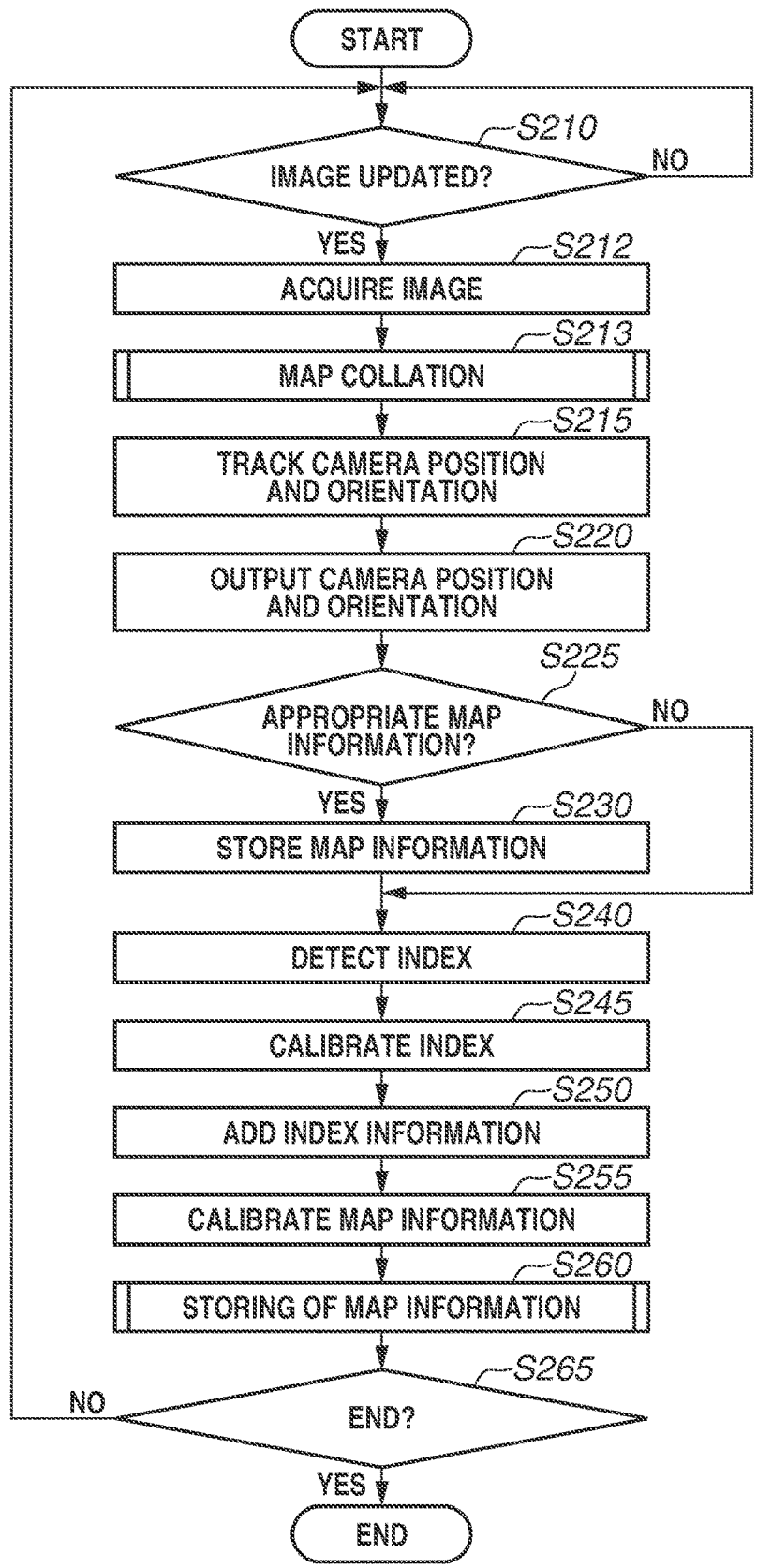

INFORMATION PROCESSING APPARATUS AND METHOD OF ESTIMATING POSITION AND ORIENTATION OF IMAGE CAPTURING APPARATUS

BACKGROUND OF THE DISCLOSURE

FIELD OF THE DISCLOSURE

The aspect of the embodiments relates to technologies to estimate a position and orientation of an image capturing apparatus from captured images.

DESCRIPTION OF THE RELATED ART

There has been performed virtual design to consider design of products or to perform design verifications before producing prototypes. The virtual design technology offers a feeling of mixed reality to users in which virtual space information is superimposed on the real space in real time. To create a feeling of mixed reality, the position and orientation of the image capturing apparatus is determined, and the real space and the virtual space are aligned with each other. Specifically, to composite and display a three-dimensional model such as computer-aided design (CAD) data on a real image captured by a camera, the three-dimensional model is rendered from a viewpoint based on the position and orientation of the camera, which creates a feeling of mixed reality as if the three-dimensional model were placed in the real space. Conventionally, a method is often used of placing rectangular indices each called a "marker" including identification information in a real space, extracting marker information from captured images of the real space, and estimating the position and orientation of a camera based on the marker information.

In the above-mentioned method, making an alignment in a wide area involves arrangements of a plurality of markers in a real space in advance and calibration and determination of the relative positions and orientations of the markers beforehand, which is applicable only to work sites that have enough time to do them. On the other hand, to reduce preliminary work, there has been proposed a method of estimating the position and orientation of a camera by tracking not markers but feature points (such as patterns of corner points or acute angles) through successive frames of captured images (e.g., see Georg Klein and David Murray, "Parallel Tracking and Mapping for Small AR Workspaces", in Proc. International Symposium on Mixed and Augmented Reality, 2007). This paper discusses a method of tracking feature points in the real space in successive frames, converting information corresponding to the feature points through the frames into three-dimensional points using the method of Structure from Motion, and optimizing three-dimensional information about the feature points through bundle adjustment. Further, optimization calculation in alignment processing can be omitted by storing the optimized information on the three-dimensional points as map information and reading the map information at the same place. However, if the alignment processing is performed by the above-described method at different places or in situations different in time to create map information every alignment, which map information is to be read among the pieces of map information will not be clear. That takes some time for the user to check map information before reading it. To save the user the trouble, a method is discussed of searching for and identifying an image similar to an image currently on a camera from among a plurality of pieces of map information (Robert Castle, Georg Klein, and David W Murray, "Video-rate Localization in Multiple Maps for Wearable Augmented Reality", in Proc. International Symposium on Wearable Computing (ISWC), 2008). Further, Japanese Patent Application Laid-Open No. 2015-211363 discusses a technology that provides a more stable, highly accurate alignment by referring to both markers and feature points in images.

The method discussed in the above-described paper by Castle, et. al., however, takes increased time to identify a map in proportion to the file size of the map information, which increases the time to select the map. In addition, the user will wear a video see-through head mounted display (abbreviated as HMD) to experience a feeling of mixed reality. The HMD may be provided with operation buttons for selection thereon. On the other hand, the estimation of a position and orientation of the camera with high accuracy will involve the selection of appropriate map information from among a plurality of pieces of map information. Specifically, appropriate list items will be selected from among a plurality of pieces of map information in a list displayed. If the user with the HMD operates operation buttons to select an appropriate list item in a displayed list, that will increase the frequency of operations to select items, taking a long time until a desired item is selected.

The aspect of the embodiments is directed to estimation of the position and orientation of the camera with high accuracy in a short time.

SUMMARY OF THE DISCLOSURE

According to an aspect of the embodiments, an apparatus includes a generation unit configured to generate map information including a position of a feature point and identification information on an index in an image of a real space captured by a capturing apparatus, a collation unit configured to collate the identification information on the index in the generated map information with the identification information on the index in one or more pieces of registered map information, and to extract map information from the one or more pieces of registered map information based on a result of the collation, and an estimation unit configured to estimate a position and orientation of the capturing apparatus based on the position of the feature point in the extracted map information and the position of the feature point in the generated map information.

Further features of the disclosure will become apparent from the following description of exemplary embodiments with reference to the attached drawings.

BRIEF DESCRIPTION OF THE DRAWINGS

FIGS. 5A to 5C each illustrate a data configuration example of map information according to the exemplary embodiment.

FIGS. 6A and 6B are list examples displayed of map information candidates.

FIG. 7 is a flowchart of information processing according to the first exemplary embodiment.

DESCRIPTION OF THE EMBODIMENTS

Some exemplary embodiments will be described in detail below with reference to accompanying drawings. The following exemplary embodiments do not limit the disclosure.

Figure 1:
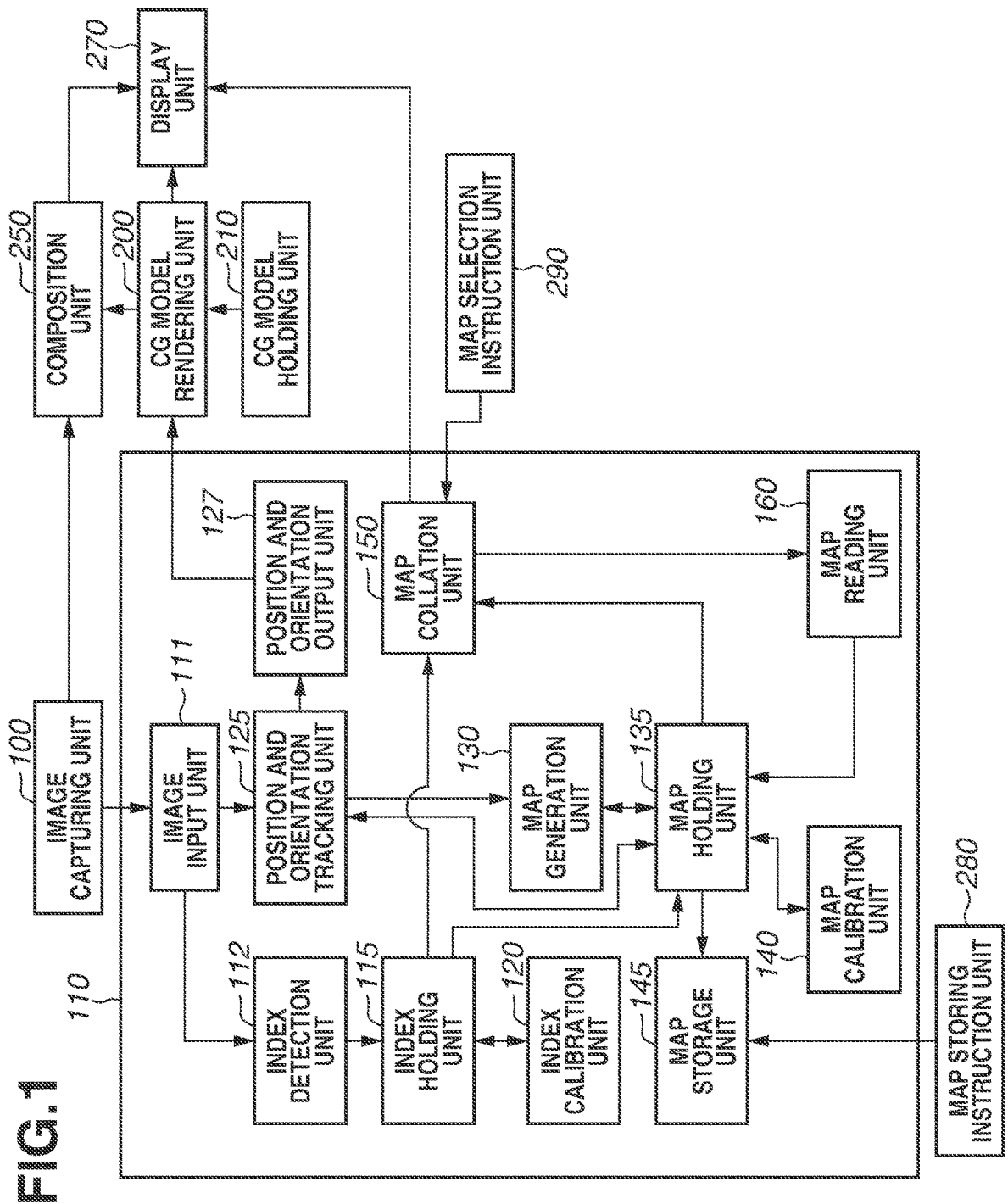
FIG. 1 is block diagram illustrating a functional configuration example of an information processing apparatus according to a first exemplary embodiment.
Figure 2:
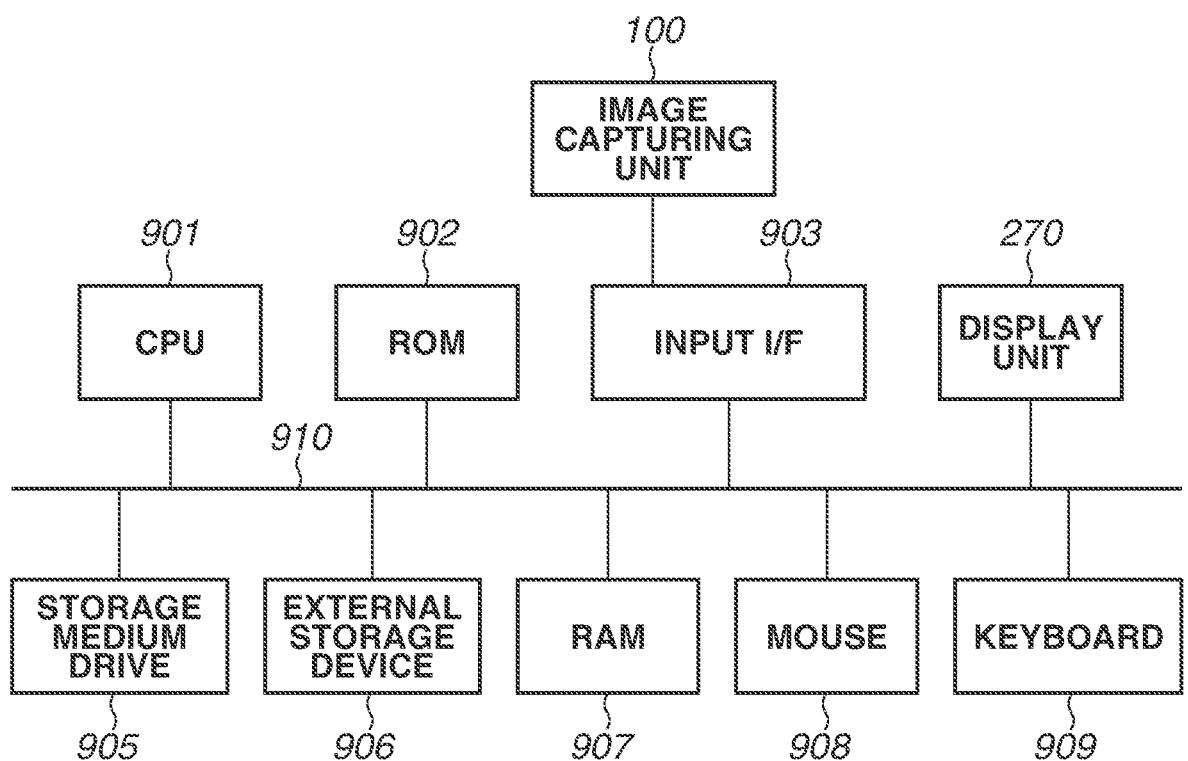
FIG. 2 is a diagram illustrating a hardware configuration example.

FIG. 1 is a diagram illustrating a schematic block configuration for camera position and orientation estimation processing as an example of information processing according to a first exemplary embodiment. FIG. 2 is a diagram illustrating a hardware configuration example to perform the information processing according to the present exemplary embodiment.

Figure 3:
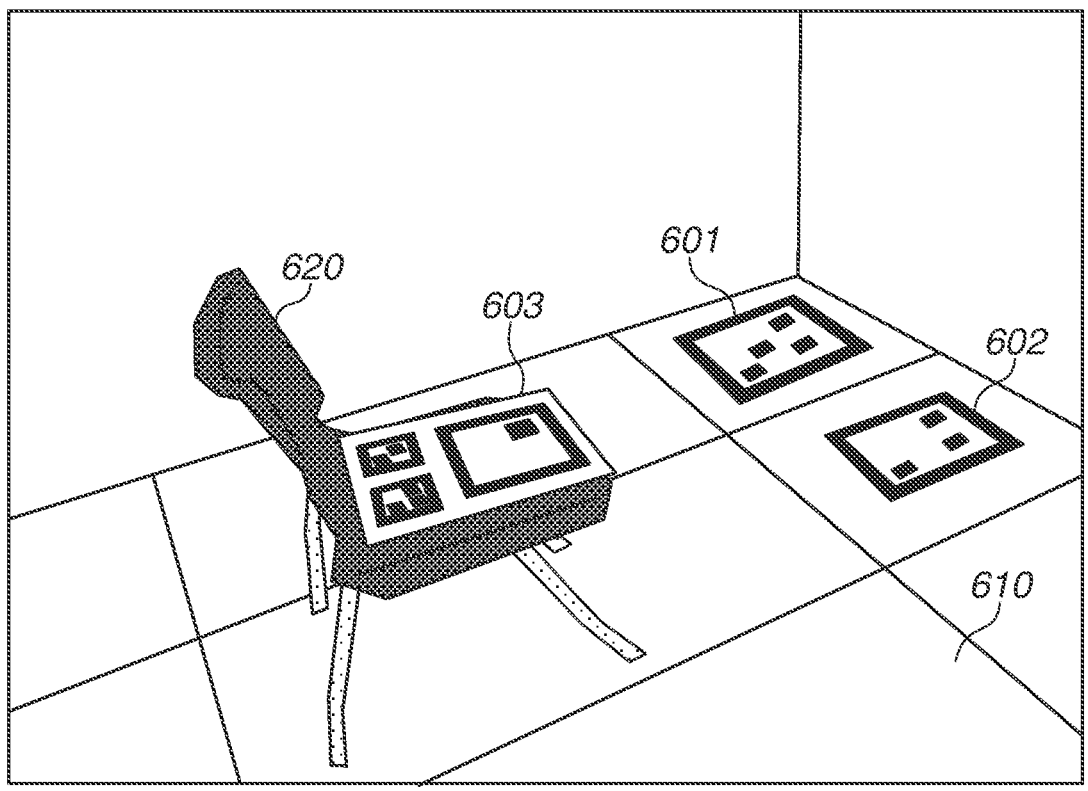
FIG. 3 is a diagram illustrating a real scene in verification of interior design.
Figure 4:
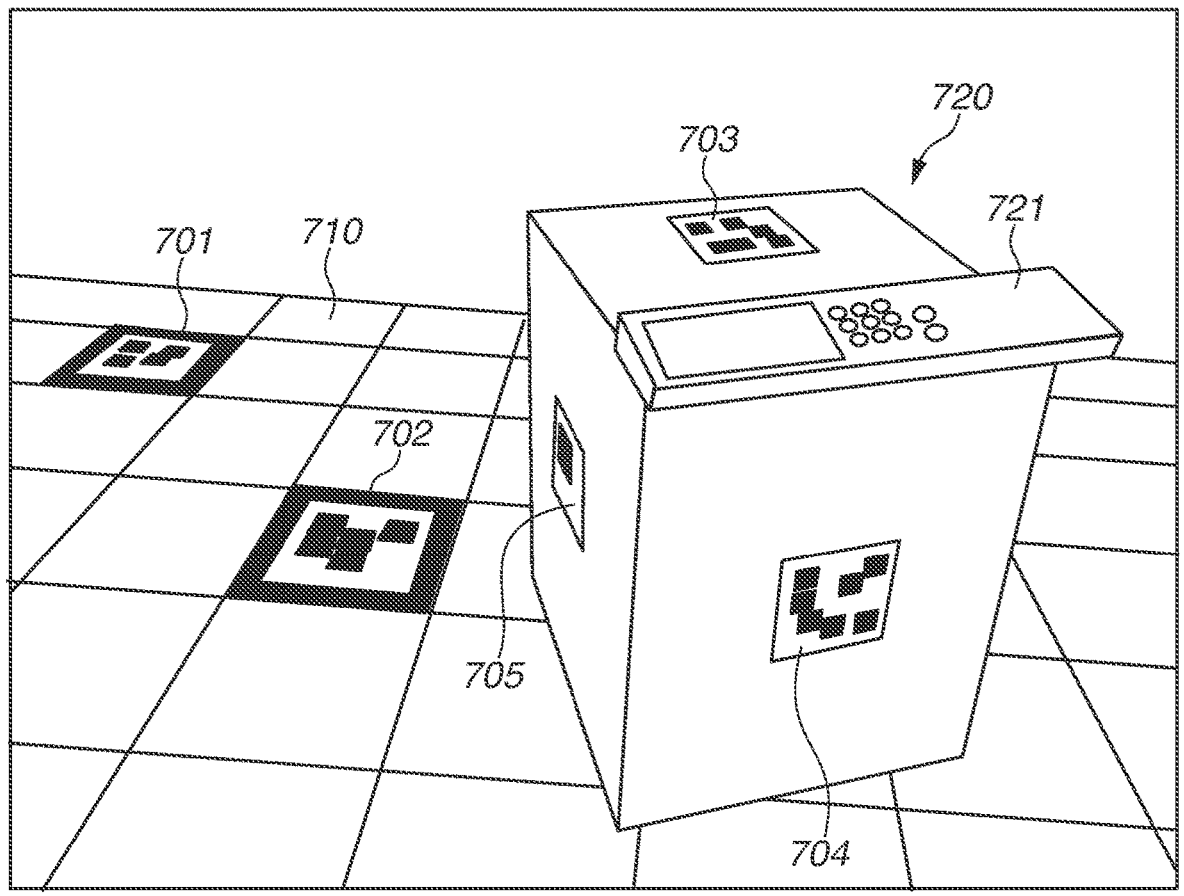
FIG. 4 is a diagram illustrating a real scene in verification of operability of a copy machine operation panel.

In the present exemplary embodiment, a system to present a feeling of mixed reality will be described as an example of an information processing apparatus. For example, it is assumed that a feeling of mixed reality is used to perform verification in a scene of verifying the design of indoor interior as illustrated in FIG. 3 and in a scene of verifying operability of an operation panel on a copy machine as illustrated in FIG. 4. FIG. 3 is a diagram schematically illustrating a scene of compositing and displaying an interior computer graphics (CG) model including a chair 620 on a captured real image of a room 610, and of verifying the interior design from a viewpoint of a user (e.g., viewpoint of a user sitting on a chair). FIG. 4 is a diagram schematically illustrating a scene of compositing and displaying a CG model including a copy machine 720 on a captured real image of a room 710, and of verifying operability of an operation panel 721 on the copy machine 720 before a prototype is produced. In the different scenes as illustrated in FIG. 3 and FIG. 4, different real objects are also placed, not allowing the same map information to be used. Thus, map information suitable for each of the scenes is selected to be read. In the scene illustrated in FIG. 3, markers 601 to 603 each having identification information are placed in the real space to improve accuracy and stability of camera position and orientation estimation. Likewise, in the scene illustrated in FIG. 4, markers 701 to 705 each having identification information are placed in the real space of the room 710 for the same reason. In most of such scenes, markers are attached to real objects; markers placed in each of the scenes have different marker identifications (IDs).

A configuration and operation of the information processing apparatus according to the present exemplary embodiment will be described on the assumption of the scene examples of FIG. 3 and FIG. 4.

As illustrated in FIG. 1, the information processing apparatus according to the present exemplary embodiment has a configuration in which an image capturing unit 100, a CG model rendering unit 200, a display unit 270, a map storing instruction unit 280, a map selection instruction unit 290, and other units are connected to a camera position and orientation estimation unit 110. The display unit 270 is connected to the camera position and orientation estimation unit 110 through the CG model rendering unit 200.

The information processing apparatus according to the present exemplary embodiment performs the information processing (camera position and orientation estimation processing) with a hardware configuration illustrated in FIG. 2. A central processing unit (CPU) 901 controls the whole of the apparatus. A random access memory (RAM) 907 is used as a work area when the CPU 901 performs processing while controlling each of the units. A read only memory (ROM) 902 stores control programs, various kinds of application programs, data, etc. The CPU 901 loads control programs stored in the ROM 902 into the RAM 907 and runs them to implement the functions of the camera position and orientation estimation unit 110 of FIG. 1. An input interface (I/F) 903 acquires image signals captured by the image capturing unit 100 as input signals in a format that can be processed by the camera position and orientation estimation unit 110. At least some of the functional units of the camera position and orientation estimation unit 110 illustrated in FIG. 1 may serve as dedicated pieces of hardware. In this case, the dedicated pieces of the hardware operate under the control of the CPU 901.

The image capturing unit 100 is an image capturing apparatus to capture images of the real space (e.g., a room) where the markers are placed as illustrated in FIG. 3 and FIG. 4 described above, and is a color camera in the present exemplary embodiment. As a video see-through head mounted display (HMD) provides a real image to both eyes, the image capturing unit 100 often uses two stereo cameras. The image capturing unit 100, however, is not limited to the use, and a monocular camera is applicable. Further, the image capturing unit 100 is not limited to the camera mounted on the HMD, and a commercially-available video camera may be used.

An image input unit 111 acquires an image signal (hereinafter, referred to as a camera image) from the image capturing unit 100. The input camera image is transmitted to a position and orientation tracking unit 125 and an index detection unit 112.

The index detection unit 112 performs processing to detect markers from the input camera image. The marker detection processing according to the present exemplary embodiment is performed using the method discussed in Japanese Patent Application Laid-Open No. 2015-211363. In other words, the index detection unit 112 performs the detection of rectangular areas as markers in the camera image, the ID identification through recognition of the two-dimensional barcode added to each of the markers, the estimation of the three-dimensional position and orientation of each of the markers, etc. Further, the index detection unit 112 transmits, to an index holding unit 115, the ID and the three-dimensional position and orientation information on each of the markers that are data of a marker detection result, together with the camera image (a current captured real image).

The index holding unit 115 stores (accumulates) the information transmitted from the index detection unit 112 and the data of the camera image. The index holding unit 115 accumulates the data transmitted from the index detection unit 112 every time the camera image is updated. In the present exemplary embodiment, when the image capturing unit 100 captures an image of the room where the markers are placed as illustrated in FIG. 3 and FIG. 4, the detection information on the markers placed in the room, etc. is accumulated. In the following description, the marker detection information is referred to as marker information. FIG. 5C illustrates an example of the marker information in the present exemplary embodiment. As illustrated in FIG. 5C, the marker information is information consisting of the marker ID and the three-dimensional position and orientation information including a position, an orientation rotation axis, and an orientation rotation angle of the marker. The marker information is held in the index holding unit 115.

An index calibration unit 120 calibrates relative position and orientation information on the plurality of markers with the marker information held in the index holding unit 115. The calibration processing corrects the position and orientation of each of the markers, improving the accuracy of the camera position and orientation output by the camera position and orientation estimation unit 110 according to the present exemplary embodiment. A bundle adjustment method is used for calibration of the relative position and orientation between the markers in the present exemplary embodiment. The method involves the association of three-dimensional positions of four vertices of the same marker in the plurality of images with one another based on the ID in the marker information, and then the estimation of the three-dimensional positions of the vertices minimizing reprojection error of the vertices in each of the images. The marker information calibrated (corrected) in the above-described manner is transmitted to the index holding unit 115, and the marker information held in the index holding unit 115 is updated with the calibrated marker information.

The position and orientation tracking unit 125 estimates the current three-dimensional position and orientation of the image capturing unit 100 in the real space, namely, the camera position and orientation in the real space, based on the input camera images and map information read out from a map holding unit 135 described below. In the present exemplary embodiment, the camera position and orientation are estimated using the method discussed in Georg Klein and David Murray, "Parallel Tracking and Mapping for Small AR Workspaces", in Proc. International Symposium on Mixed and Augmented Reality, 2007. The method involves the determination of whether tracking is possible with the feature points in the current camera image associated with the feature points in the camera image of one preceding frame, the projection of the three-dimensional feature point positions associated with the respective feature points determined to be trackable onto the current camera image, and then the estimation of the camera position and orientation is estimated so that a sum of distances in the image between the projected points and the respective corresponding feature points of the current camera image can be minimized.

The three-dimensional feature point positions associated with the respective feature points are acquired from the map information read out from the map holding unit 135 described below. If the map information has not been present yet before the map information is stored in the map holding unit 135 or the map information has not been read yet, the three-dimensional feature point positions may be calculated using, for example, a method discussed in Japanese Patent Application Laid-Open No. 2018-14579. This method involves the extraction of the feature points from a first camera image in initialization processing, the selection of, as a keyframe, an image immediately before the number of tracked feature points becomes less than or equal to a predetermined number from among successive camera images subsequent to the first camera image, the calculation of change in the relative positions and orientations of the feature points between the first image and the selected keyframe, and the calculation of the three-dimensional positions of the tracked feature points using the principle of a triangulation method. The use of the three-dimensional positions of the feature points acquired in the above-described manner enables the calculation of the camera position and orientation. The position and orientation tracking unit 125 further performs processing to inquire of the map holding unit 135 about whether the appropriate map information is present.

Further, the position and orientation tracking unit 125 transmits the information on the estimated camera position and orientation to a position and orientation output unit 127.

The position and orientation output unit 127 outputs the camera position and orientation estimated by the position and orientation tracking unit 125 to the CG model rendering unit 200.

A map generation unit 130 determines whether to store the information that has been used when the position and orientation tracking unit 125 had performed the camera position and orientation tracking, in the map holding unit 135. In the present exemplary embodiment, the estimated current camera position and orientation is compared with the camera position and orientation of the keyframe in the map information held in the map holding unit 135. If a difference between the positions and a difference between the orientations exceed respective predetermined thresholds, the information is added to the map holding unit 135. The map generation unit 130 outputs feature point information illustrated in FIG. 5A to the map holding unit 135. The feature point information in FIG. 5A represents the three-dimensional positions of the feature points tracked by the camera position and orientation estimation unit 110.

The map holding unit 135 associates the feature point information in the current camera image selected by the map generation unit 130 with the index information detected in the current camera image. After that, the map holding unit 135 holds the associated information as the map information.

The map information in the present exemplary embodiment is information enabling identification of a position of the real space, and includes, for example, information illustrated in FIGS. 5A to 5C. In other words, the map information includes the feature point information in FIG. 5A, the keyframe information in FIG. 5B, and the marker information in FIG. 5C. The keyframe information in FIG. 5B holds the feature point IDs and the marker IDs, those of which are associated with each other. Further, the map holding unit 135 outputs the map information to the position and orientation tracking unit 125 to provide information for the estimation of the camera position and orientation. Moreover, the map holding unit 135 outputs the map information to a map storage unit 145 in response to a map storing request.

A map calibration unit 140 corrects the three-dimensional positions in the feature point information in the map information held in the map holding unit 135. In the present exemplary embodiment, the three dimensional positions in the feature point information in the map information are corrected using, for example, the bundle adjustment method for the three-dimensional points of the map discussed in the above-described paper by Klein, et. al. In the method, if the three-dimensional positions of the feature points in each of the keyframe IDs are within an effective range of a predetermined distance threshold, the feature points are determined to be the same feature point and associated. Further, the map calibration unit 140 performs the bundle adjustment processing on the camera position and orientation stored at the keyframe position and the three-dimensional positions of the feature points referred by the feature point IDs to acquire three-dimensional positions of the feature points with higher accuracy, as with the index calibration unit 120. The map calibration unit 140 then reflects the calibrated (corrected)

three-dimensional positions of the feature points in the feature point information held in the map holding unit 135, thereby updating the three-dimensional positions of the feature points.

The map storage unit 145 stores, in an external storage device 906, the map information held in the map holding unit 135 at the timing a map storing request is issued from the user or the system through the map storing instruction unit 280. An instruction of a map storing request is likely to be issued at a timing when the user finishes capturing of images of the entire target scene by the camera and confirms no problems with alignment accuracy and stability using the current map information held in the map holding unit 135. Examples of the timing based on the instruction from the user include a timing when the user selects an item from the list of the map information and issues a determination instruction to fix the selection of the item.

A map collation unit 150 is a module enabling the camera position and orientation estimation unit 110 according to the present exemplary embodiment to output the camera position and orientation with high accuracy by selecting an appropriate map and updating the map information in the map holding unit 135. If an inquiry whether the appropriate map is present is transmitted from the map holding unit 135, the map collation unit 150 collates the current map information with a plurality of pieces of known map information stored in the external storage device 906 to determine whether a piece of map information more appropriate than the current map information is present among the plurality of known map information. If the map information more appropriate than the current map information is stored in the external storage device 906 as a result of the map collation, the map collation unit 150 reads out the corresponding map information from the external storage device 906 through a map reading unit 160. The map collation unit 150 then updates the corresponding map information in the map holding unit 135 with the read map information. The map collation processing by the map collation unit 150 will be described in detail below.

Further, in the present exemplary embodiment, if a plurality of pieces of map information more appropriate than the current map information is found as a result of the map collation processing, a candidate list including the plurality of pieces of map information as map candidates is displayed on the display unit 270. When an instruction to select one of the map candidates in the candidate list is input by the user, a map selection instruction unit 290 notifies the map collation unit 150 of the selected map candidate.

FIG. 6B illustrates an example of the candidate list displayed on the display unit 270.

FIG. 6A illustrates an example of the candidate list including all pieces of map information as the map candidates.

The following is a consideration of a user selecting one of the map candidates in a candidate list displayed as illustrated in FIG. 6A. In this case, for example, the user would select one of the map candidates with an operation controller provided separately; however, the user experiencing a feeling of mixed reality with the HMD may often not want to hold the operation controller. Further, an operation button provided on the HMD would offer a simple operation; however, an increase in the number of operation buttons in the HMD will entail increased cost or erroneous operation, which is not appropriate. As a consequence, the user would select one of the map candidates in the candidate list as illustrated in FIG. 6A through the operation of two operation buttons, for example, a "selection button" and a "determination button" provided on the HMD. In this case, to select one of the map candidates in the candidate list as illustrated in FIG. 6A, the user would select one candidate map with the selection button, and fix the selection with the determination button. In this case, however, with a number of map candidates listed, the user would operate the selection button frequently, taking a lot of time to finish the selection. Further, the user would determine whether each of the map candidates is appropriate by the date and time of storage when each piece of map information is stored as the information for determination whether each of the map candidates in the candidate list of FIG. 6A is appropriate. If the user is not present on site when the map information is stored, however, the user cannot determine whether the map information stored at that time is appropriate. Thus, with the list as illustrated in FIG. 6A displayed, the user will select each of the map candidates to check the alignment state one by one. A selection of a proper piece of map information from among many map candidates is highly likely to take a long time.

In contrast, in the present exemplary embodiment, the user is presented the candidate list of the candidates narrowed down by collation of the map collation unit 150 as illustrated in FIG. 6B. This enables the user to select an appropriate piece of map information in a short time. The processing to generate the candidate list as illustrated in FIG. 6B will be described in detail below.

The map collation processing by the map collation unit 150 may be carried out based on a learning result of machine learning. In this case, the marker IDs, the marker positions, the marker orientations, and the three-dimensional positions of the feature points stored in the map holding unit 135 are input, and the candidate list of the map information acquired from the learning result is used.

The CG model rendering unit 200 reads a three-dimensional model (e.g., CAD model data) held in a CG model holding unit 210, and renders a CG model based on the camera position and orientation output from the position and orientation output unit 127 to generate a CG model image.

A composition unit 250 composites the captured image by the image capturing unit 100 with the CG model image generated by the CG model rendering unit 200, and displays a composite image on the display unit 270.

The display unit 270 is a display presenting the image composited by the composition unit 250. The display unit 270 further has the function of presenting the list of the map information presented by the map collation unit 150 to the user. The display may be a display mounted on the HMD or a stationary large-size monitor.

FIG. 7 is a flowchart illustrating a procedure of information processing according to the first exemplary embodiment.

In step S210, the image input unit 111 determines whether the camera image of the image capturing unit 100 has been updated. If the camera image has been updated (YES in step S210), the processing proceeds to step S212. Otherwise (NO in step S210), the image input unit 111 repeats the processing in step S210 to check update of the image.

In step S212, the image input unit 111 acquires the camera image of the image capturing unit 100, and stores the camera image in the RAM 907.

In step S213, the map collation unit 150 performs map collation processing to check whether a piece of map information more appropriate than the current map information is present. If the map collation unit 150 determines that a piece of map information more appropriate than the current map information is present, the map collation unit 150 requests the map reading unit 160 to read the piece of map information. The map reading unit 160 that has received the request reads the piece of map information from the external storage device 906. The map collation processing in step S213 will be described in detail below.

In step S215, the position and orientation tracking unit 125 estimates the camera position and orientation based on the input image and the map information as a result of the collation by the map collation unit 150.

In step S220, the position and orientation output unit 127 outputs information on the camera position and orientation estimated in step S215, to the CG model rendering unit 200.

In step S225, the map generation unit 130 determines whether to register the feature point information acquired by the position and orientation tracking unit 125, in the map holding unit 135. In the present exemplary embodiment, it is determined whether the feature point information is to be added to the keyframe information using the method discussed in Georg Klein and David Murray, "Parallel Tracking and Mapping for Small AR Workspaces", in Proc. International Symposium on Mixed and Augmented Reality, 2007. More specifically, on a condition that the number of tracked feature points is greater than or equal to a predetermined number, and that a camera moving distance or a camera orientation variation is greater than or equal to a predetermined value (YES in step S225), the map generation unit 130 registers the feature point information in the map holding unit 135 in step S230. If the above-described condition is not satisfied (NO in step S225), the map generation unit 130 does not register the feature point information in the map holding unit 135, and the processing proceeds to step S240.

In step S230, the map generation unit 130 stores (registers) the feature point information acquired by the position and orientation tracking unit 125, in the map holding unit 135.

In step S240, the index detection unit 112 detects the markers in the camera image. The information on the markers detected at this time is held in the index holding unit 115.

In step S245, the index calibration unit 120 calibrates the relative positions and orientations of the markers, and updates the marker information in the index holding unit 115.

In step S250, the index holding unit 115 outputs the information on the markers detected in the current camera image, to the map holding unit 135.

In step S255, the map calibration unit 140 calibrates the feature point information based on the map information.

In step S260, the map storage unit 145 stores the map information in the external storage device 906. The storing processing will be described in detail below.

In step S265, the map selection instruction unit 290 checks presence/absence of an end instruction from the user. If the end instruction is present (YES in step S265), the processing in the flowchart of FIG. 7 ends. Otherwise (NO in step S265), the processing returns to step S210.

Figure 8:
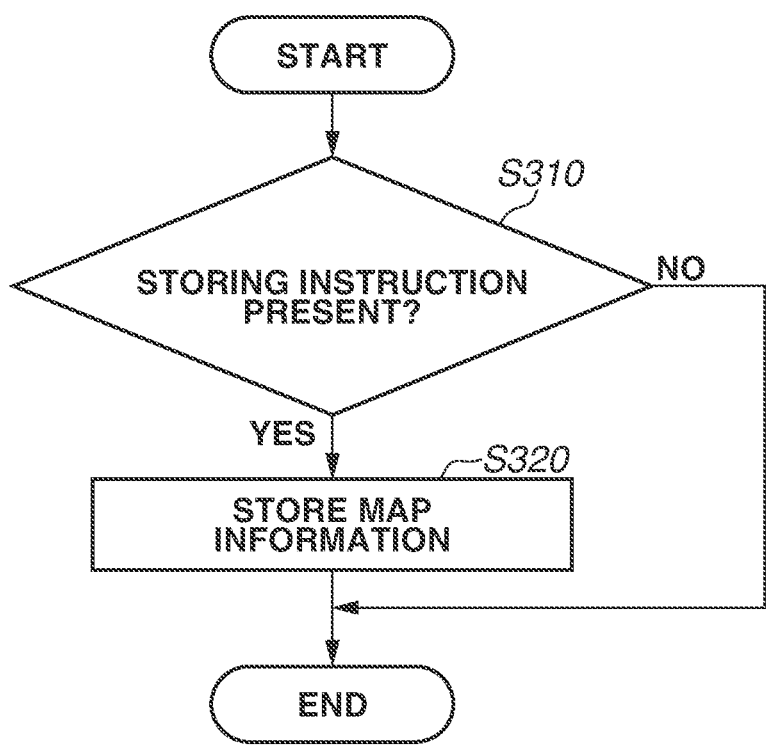
FIG. 8 is a flowchart of map information storing processing.

FIG. 8 is a flowchart illustrating the detail of the processing to store the map information in step S260 of FIG. 7.

In step S310, the map storage unit 145 determines whether an instruction from the map storing instruction unit 280 is present. If the instruction is present (YES in step S310), the processing proceeds to step S320. Otherwise (NO in step S310), the processing in the flowchart of FIG. 8 ends.

In step S320, the map storage unit 145 reads out the map information stored in the map holding unit 135, and stores the map information in the external storage device 906.

Figure 9:
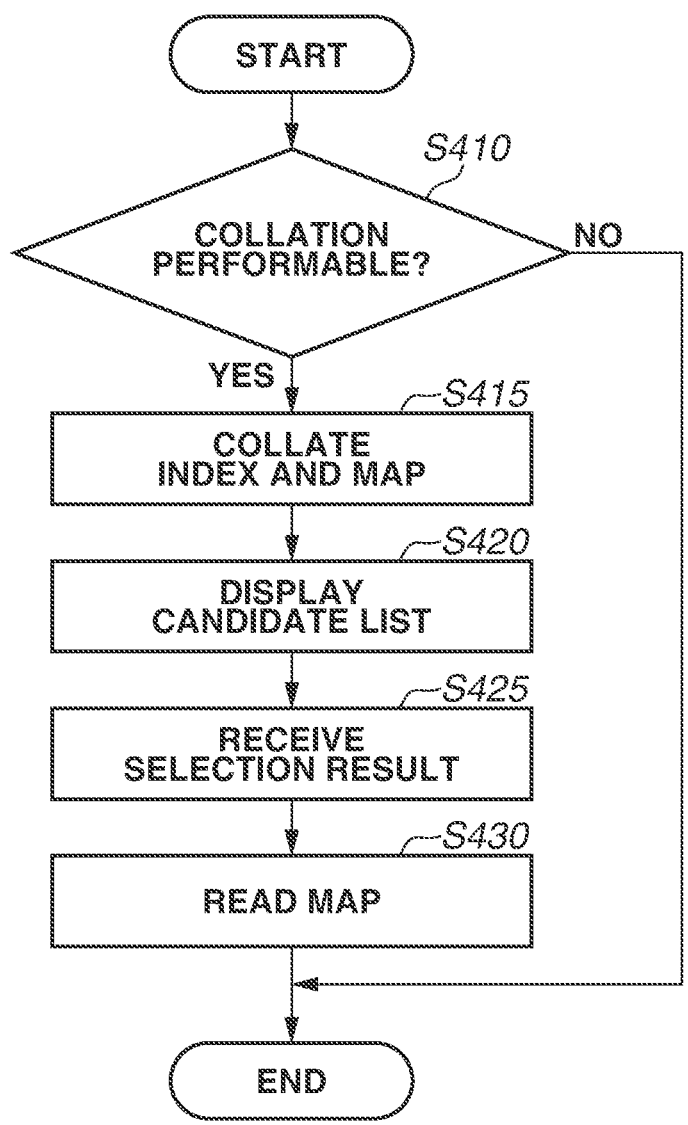
FIG. 9 is a flowchart of map collation processing according to the first exemplary embodiment.

FIG. 9 is a flowchart illustrating the detail of the map collation processing in step S213 of FIG. 7.

In step S410, the position and orientation tracking unit 125 inquires of the map collation unit 150 through the map holding unit 135 about whether collatable map information is present. If collatable map candidates are present in the external storage device 906 (YES in step S410), the processing proceeds to step S415. Otherwise (NO in step S410), the processing in the flowchart of FIG. 9 ends.

In step S415, the map collation unit 150 collates the marker information held in the map holding unit 135 by an image of the real space being captured with the marker information in the known map information (acquired in past) stored in the external storage device 906. In the present exemplary embodiment, the map collation unit 150 first generates a candidate list of all of the marker IDs in the marker information held in the map holding unit 135. Next, the map collation unit 150 refers to the marker information in the known map information stored in the external storage device 906, and adds the map information including all of the marker IDs in the map holding unit 135 among the map information stored in the external storage device 906 to the candidate list. In other words, the IDs of the markers placed in the current real space are highly likely to be in the map information that has been generated before and stored in the external storage device 906. Thus, the map collation unit 150 adds the map information including all of the marker IDs in the map holding unit 135 among the plurality of pieces of map information stored in the external storage device 906 to the candidate list, thereby narrowing down the candidates to be added to the candidate list.

In step S420, the map collation unit 150 transmits the candidate list of the map information to the display unit 270 to display the candidate list. The date and time when the map information is acquired as illustrated in FIG. 6B described above are presented to the user by display of the candidate list of the map information. Presentation of the candidate list of the map information is not limited to display of the date and time. If the user can add a name to each of pieces of map information, the names may be presented in a candidate list. In addition, the map information may include global positioning system (GPS) information, presenting a place on a map based on the GPS information. Furthermore, a representative image of the image data of the keyframe information held in the map information may be presented.

In step S425, the map collation unit 150 receives a selection instruction from the user through the map selection instruction unit 290, and identify one piece of map information corresponding to the selection instruction.

In step S430, the map reading unit 160 copies the map information identified by the map collation unit 150 from the external storage device 906 to the RAM 907, and notifies the map holding unit 135 of a reading completion of the map.

Figure 10:
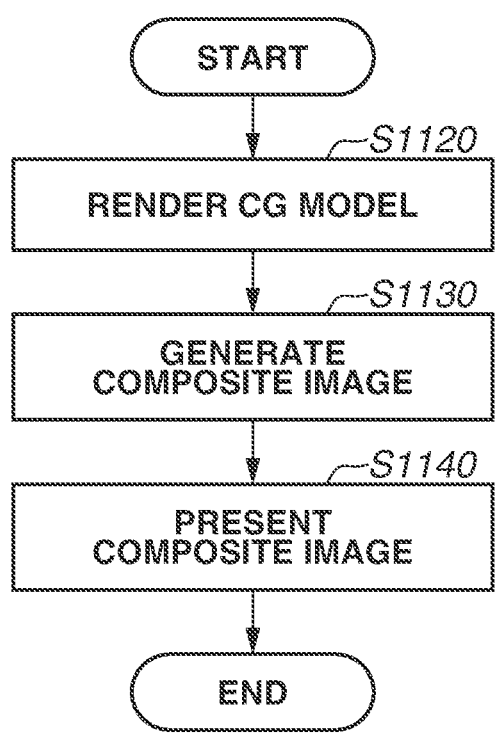
FIG. 10 is a flowchart of a composite image presentation processing.

FIG. 10 is a flowchart illustrating processing in the present exemplary embodiment performed after the camera position and orientation is output in the camera position orientation output processing in step S220 of FIG. 7. In the present exemplary embodiment, an exemplary method will be described in which the display unit 270 (e.g., display of HMD) displays a composite image of the captured real image and the CG model which is rendered based on the camera position and orientation.

In step S1120, the CG model rendering unit 200 reads the CG model stored in the CG model holding unit 210, and renders the CG model based on the camera position and orientation output from the camera position and orientation estimation unit 110.

In step S1130, the composition unit 250 composites the image of the CG model rendered in step S1120 with the captured real image to generate a composite image.

In step S1140, the display unit 270 displays the composite image generated in step S1130 to present the composite image to the user.

As described above, in the first exemplary embodiment, the plurality of pieces of map information stored in the external storage device 906 is collated based on the marker IDs of the markers placed in the real space, which narrows down the candidates for the appropriate map information. Thus, according to the present exemplary embodiment, the number of map candidates to be presented to the user can be reduced, shortening the time for identification of the appropriate map information.

A second exemplary embodiment will be described. In the first exemplary embodiment, the method has been described of presenting the candidate list to allow the user to select the map information in the processing in steps S420 to S425. In the second exemplary embodiment, an example will be described of calculating a match score of the map information based on predetermined criteria, and automatically selecting the map information having the calculated match score most matching with the criteria. In the present exemplary embodiment, an exemplary method will be described of calculating the match score of each piece of map information to select appropriate map information from among the plurality of pieces of map information.

An information processing apparatus according to the second exemplary embodiment can be realized by having a functional configuration the same as that illustrated in FIG. 1 in the first exemplary embodiment. In the second exemplary embodiment, however, the processing performed by the map collation unit 150 is different. The map collation unit 150 according to the second exemplary embodiment collates map information as in the first exemplary embodiment; however, the map collation unit 150 selects one map without receiving an instruction from the user through the map selection instruction unit 290.

Figure 11:
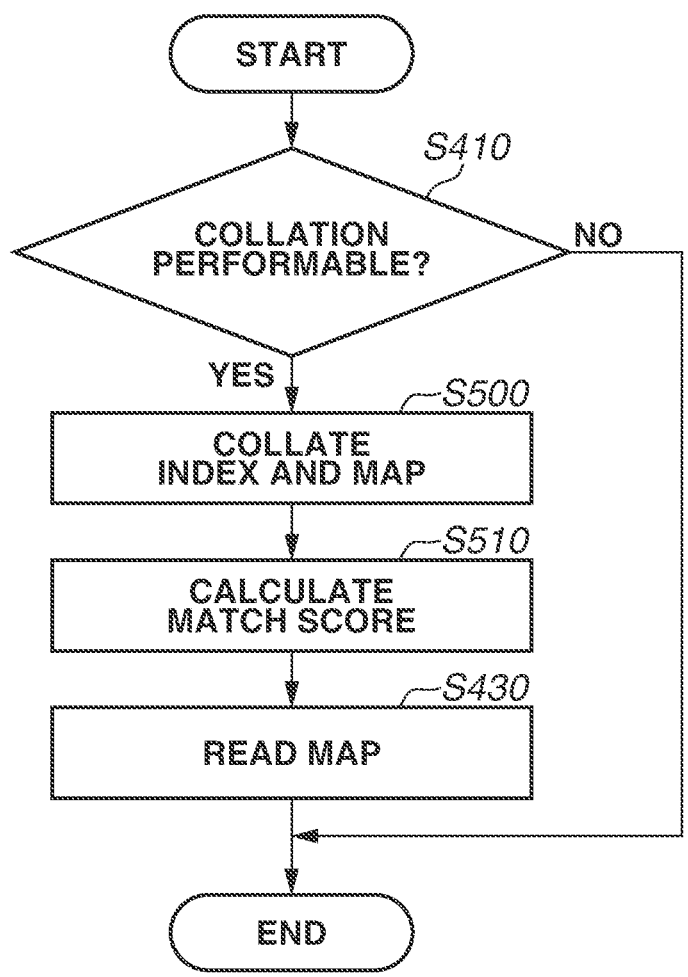
FIG. 11 is a flowchart of map collation processing according to a second exemplary embodiment.

The second exemplary embodiment is different in the processing performed by the map collation unit 150 in step S213 from the first exemplary embodiment. FIG. 11 is a flowchart illustrating the detailed processing in step S213 according to the present exemplary embodiment. Like numbers refer to like steps that perform processing the same as that in the first exemplary embodiment, and redundant descriptions thereof will be omitted. In the flowchart of FIG. 11, the processing proceeds to step S500 after step S410.

In step S500, the map collation unit 150 collates the marker IDs and the positions and orientations of the marker information stored in the map holding unit 135 with the marker IDs and the positions and orientations of the map information stored in the external storage device 906.

In step S510, the map collation unit 150 compares the marker information in the map holding unit 135 with the map information stored in the external storage device 906, to determine difference distances from positions associated with the same marker ID in the marker information. The map collation unit 150 calculates the difference distance of each of the marker IDs, and calculates an average of the plurality of difference distances. Likewise, the map collation unit 150 calculates an average difference distance for the plurality of pieces of map information stored in the external storage device 906. Further, the map collation unit 150 references a value obtained by dividing one by the average difference distance by one, as a match score of a particular map. The map collation unit 150 selects a piece of map information having the highest match score from among the plurality of pieces of map information. The selected piece of map information is read in step S430. The read piece of map information is used in the camera position and orientation tracking processing in step S215.

In the second exemplary embodiment, as described above, the use of the information on both of the marker IDs and the marker positions and orientations enables the candidate map information to be further narrowed down, which shortens the time for selection of the map information. For example, the same marker IDs used in different scenes can induce incorrect determination in the collation; however, collating the marker positions and orientations together allows more accurate determination.

The match score is not limited to the calculation of the three-dimensional position of one marker between two pieces of the map information for distance, and the match score may be calculated from relative positional information on the plurality of markers. More specifically, the map holding unit 135 selects two of the plurality of markers stored in the marker information, calculates the three-dimensional relative positions of the markers, and holds the relative positions as relative position vectors. Likewise, the map holding unit 135 calculates a relative position vector of each of the marker IDs in the marker information with the closest point in marker position, and stores the relative position vector in association with the corresponding marker ID in the marker information. The map collation unit 150 refers to the relative position vector of the map information stored in the external storage device 906, and references, as the match score, an inner product of the relative position vector of the map information stored in the external storage device 906 and the relative position vector stored in the marker ID in the marker information held in the map holding unit 135. Even if some of the markers are shifted and error affects other markers in the marker calibration processing, the use of the relative position vector in the above-described manner enables the selection of the appropriate map information.

<First Modification>

In step S500 and step S510 according to the second exemplary embodiment, the match score is calculated using the marker positions and orientations associated with the IDs of the markers as the indices. However, the calculation of the match score is not limited to the calculation using the marker IDs and the marker positions and orientations. For example, the match score may be calculated with the three-dimensional positions in the feature point information stored in the map holding unit 135. In other words, the indices are not limited to the markers, and may be information on the feature points. However, each of the feature points does not have identification information, not allowing the feature point IDs to be used for collation. As a result, the three-dimensional positions in the feature point information will be collated independent of the feature point IDs. For example, the map holding unit 135 calculates a distance between the three-dimensional position of one of the plurality of feature points in the held map information and the three-dimensional position of the same feature point in the particular map information stored in the external storage device 906, and stores the calculated distance. Likewise, the map holding unit 135 determines a distance between the three-dimensional position of each of the other feature points in the held map information and the three-dimensional position of the same feature point in the particular map information. The map holding unit 135 then creates a distance list of the particular map information. The map holding unit 135 determines an average of the distances stored in the distance list, and calculates 1/average distance as a match score of the particular map information. As described above, map information is selected that has the highest match score to the feature points in the map information stored in the map holding unit 135.

The disclosure is not limited to calculation of the match score using only the three-dimensional positions in the feature point information described in the first modification, and the match score may be calculated in combination with the marker positions and orientations according to the second exemplary embodiment. For example, a sum of the match score by the marker positions and orientations and the match score by the feature points may be defined as a match score. In addition, as it will probably take a long time to collate all of the feature points, the map collation processing may involve collating only the feature points within a predetermined distance range from the marker position in the map information.

<Second Modification>

In step S415 according to the above-described first exemplary embodiment, although whether the plurality of marker IDs is all included is checked for each ID, the comparison is not limited to comparison for each ID. For example, as a second modification, after the plurality of marker IDs are converted into hash values by a hash function, the hash values may be previously registered in the map information. In the second modification, comparing the hash values of the map information stored in the external storage device 906 with the hash values of the map information stored in the map holding unit 135 makes it possible to complete the map collation processing in a short time.

As described above, in the respective exemplary embodiments, referencing in selection of the map information the information on the indices placed in the real space stored in the map information enables simpler selection of the appropriate map information at high speed. According to each of the exemplary embodiments, the map information suitable for the current scene can be selected in a short time and the performance of the alignment processing itself can be improved.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-053008, filed Mar. 24, 2020, which is hereby incorporated by reference herein in its entirety.

What is claimed is:

1. An apparatus, comprising:
at least one processor; and
a memory coupled to the at least one processor storing instructions that, when executed by the at least one processor, cause the at least one processor to function as;
a generation unit configured to generate map information including a position of a feature point and identification information on an index in an image of a real space captured by a capturing apparatus;
a collation unit configured to collate the identification information on the index in the generated map information with the identification information on the index in one or more pieces of registered map information, and to extract map information from the one or more pieces of registered map information based on a result of the collation;
a presentation unit configured to present a list of the extracted map information;
a selection unit configured to select one piece of map information from the list based on an instruction from a user; and
an estimation unit configured to estimate a position and orientation of the capturing apparatus based on the position of the feature point in the selected map information and the position of the feature point in the generated map information.

2. The apparatus according to claim 1, wherein the presentation unit presents a registration time point of each of the plurality of pieces of map information in the list.

3. The apparatus according to claim 1,
wherein the map information includes information representing a position of the index in the real space, and
wherein the collation unit collates the identification information and the position of the index between the extracted map information and the generated map information.

4. The apparatus according to claim 1,
wherein the identification information is represented by a hash value, and
wherein the collation unit collates the hash value.

5. The apparatus according to claim 1, wherein the collation unit generates a match score based on a result of the collation, and selects one piece of map information as the extracted map information based on the match score.

6. The apparatus according to claim 5,
wherein the map information includes the identification information and a position and orientation of the index, and
wherein the collation unit generates the match score based on positions and orientations of indices having identical identification information.

7. The apparatus according to claim 5, wherein the collation unit generates the match score based on a difference between the generated map information and known map information.

8. The apparatus according to claim 7, wherein the collation unit generates the match score based on a difference distance between a position of an index in the generated map information and a position of an index in the known map information.

9. The apparatus according to claim 5, wherein the collation unit generates the match score based on a relative position between a position of an index in the generated map information and a position of an index in known map information.

10. A method, comprising:
    generating map information including a position of a feature point and identification information on an index in an image of a real space captured by a capturing apparatus;
    collating the identification information on the index in the generated map information with the identification information on the index in one or more pieces of registered map information, and extracting map information from the one or more pieces of registered map information based on a result of the collation;
    presenting a list of the extracted map information;
    selecting one piece of map information from the list based on an instruction from a user; and
    estimating a position and orientation of the capturing apparatus based on the position of the feature point in the selected map information and the position of the feature point in the generated map information.

11. The method according to claim 10,
    wherein the map information includes information representing a position of the index in the real space, and
    wherein the collating collates the identification information and the position of the index between the extracted map information and the generated map information.

12. The method according to claim 10,
    wherein the identification information is represented by a hash value, and
    wherein the collating collates the hash value.

13. The method according to claim 10, wherein the collating generates a match score based on a result of the collation, and selecting one piece of map information as the extracted map information based on the match score.

14. A non-transitory computer-readable storage medium causing a computer to executed a method comprising:
    generating map information including a position of a feature point and identification information on an index in an image of a real space captured by a capturing apparatus;
    collating the identification information on the index in the generated map information with the identification information on the index in one or more pieces of registered map information, and extracting map information from the one or more pieces of registered map information based on a result of the collation;
    presenting a list of the extracted map information;
    selecting one piece of map information from the list based on an instruction from a user; and
    estimating a position and orientation of the capturing apparatus based on the position of the feature point in the selected map information and the position of the feature point in the generated map information.

15. The non-transitory computer-readable storage medium according to claim 14,
    wherein the map information includes information representing a position of the index in the real space, and
    wherein the collating collates the identification information and the position of the index between the extracted map information and the generated map information.

16. The non-transitory computer-readable storage medium according to claim 14,
    wherein the identification information is represented by a hash value, and
    wherein the collating collates the hash value.

17. The non-transitory computer-readable storage medium according to claim 14, wherein the collating generates a match score based on a result of the collation, and selecting one piece of map information as the extracted map information based on the match score.

* * * * *